D. S. BEEBE.
FURNACE FOR PRODUCING GLASS.
APPLICATION FILED DEC. 11, 1914.

1,199,044.

Patented Sept. 26, 1916.

WITNESSES
INVENTOR.
D. S. Beebe,
By Chamberlin Freudenreich
ATTORNEYS.

UNITED STATES PATENT OFFICE.

DANIEL S. BEEBE, OF PARKERSBURG, WEST VIRGINIA, ASSIGNOR TO THE VITROLITE COMPANY, OF PARKERSBURG, WEST VIRGINIA, A CORPORATION OF WEST VIRGINIA.

FURNACE FOR PRODUCING GLASS.

1,199,044.  Specification of Letters Patent.  Patented Sept. 26, 1916.

Application filed December 11, 1914. Serial No. 876,621.

*To all whom it may concern:*

Be it known that I, DANIEL S. BEEBE, a citizen of the United States, residing at Parkersburg, county of Wood, State of West Virginia, have invented a certain new and useful Improvement in Furnaces for Producing Glass, and declare the following to be a full, clear, and exact description of the same, such as will enable others skilled in the art to which it pertains to make and use the same, reference being had to the accompanying drawings, which form a part of this specification.

When a batch comprising the various materials from which white or colored glass is made has been heated to the proper temperature to bring the bulk of the mass into the proper condition for use, there still remains an appreciable quantity of material which is known as "green", and which cannot be used without giving an imperfect product. As it is impossible successfully to heat the entire mass until perfect homogeneity is obtained and, since the "green" portion of the batch is denser than the remainder and therefore settles to the bottom of the furnace, the practice is to skim the material from the top of the batch as it is used, until finally the "green" material is reached, whereupon the furnace is emptied and a new batch made. The ordinary glass (white or colored) furnace is long and broad but comparatively shallow so that if care is exercised in dipping out the material, a long broad layer of molten glass fit for immediate use must be left above the "green" material in order to insure that the ladle will not dip up some of the latter. The percentage of waste material in an ordinary batch, particularly for colored glass, that is glass other than transparent, is therefore very great.

The object of my invention is to produce an improved furnace by means of which the amount of waste due to separation of the "green" material is made very much less than heretofore.

Figure 1:
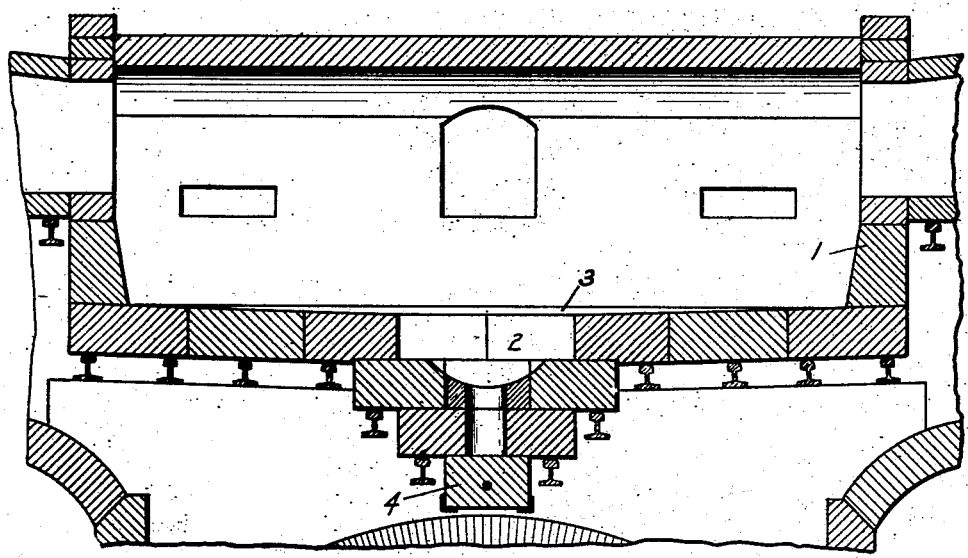
Figure 2:
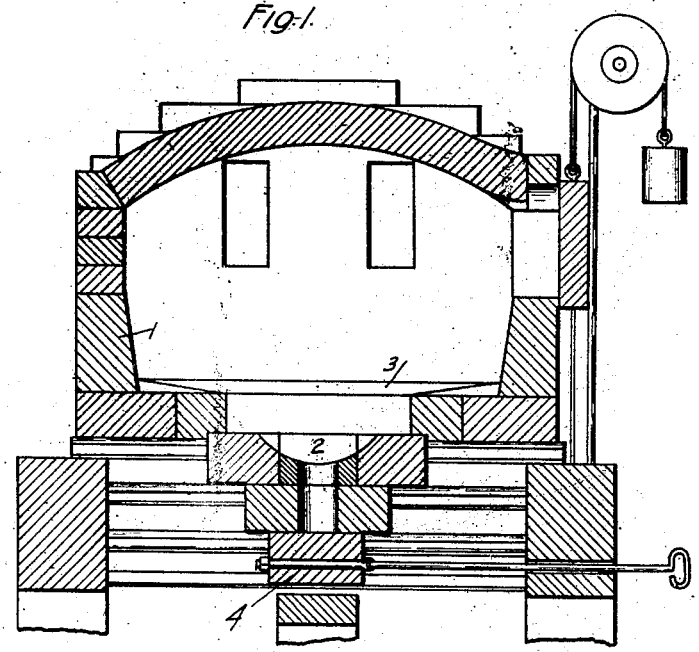

The various features of novelty whereby my invention is characterized will hereinafter be pointed out with particularity in the claims; but, for a full understanding of my invention and of its object and advantages, reference may be had to the following detailed description taken in connection with the accompanying drawing, wherein:

Figure 1 is a vertical section, diagrammatic in character, through my improved furnace; and Fig. 2 is a transverse section taken at right angles to the plane of Fig. 1 through the middle of the furnace.

Referring to the drawing, 1 represents a furnace of the usual kind for melting glass forming constituents. In accordance with my invention I form in the bottom of the furnace, at any suitable point therein, a well or catch basin, 2, and cause the floor, 3, to slope from all directions toward the well or catch basin. The capacity of the well or catch basin is made such that it will contain all of the denser material which settles to the bottom of a batch of the size for which the furnace is designed, that is to say from two to four per cent. of the batch. In fact, it will usually be found preferable to make the well or catch basin slightly larger than is necessary to hold the "green" material.

When a batch of glass forming material is fused in the furnace, the dense "green" material settles to the bottom and, because of the sloping floor in the furnace, it gravitates toward the well or catch basin and settles therein. The result is that all of the fused material above the floor line of the furnace is fit for use and the furnace can therefore be completely emptied to supply casting tables or for other commercial purposes, without paying any particular attention to the "green" material since this will all be contained in the well or catch basin. By giving a slight excess capacity to the well or catch basin, the uppermost layer therein will be of the same grade and character as the main portion of the batch and therefore there will be no danger of taking up "green" material when the last few ladles full are dipped out of the furnace.

The bottom of the well or catch basin may be closed by a suitable detachable plug, 4, which may be removed to discharge the contents of the well or catch basin after the furnace has been emptied.

With my improved furnace, the waste occasioned by the separation of the "green" material is greatly reduced, the waste in the old type of furnace of the same capacity and working under the same conditions as my improved furnace being often eight or ten times as great.

I claim:

1. A furnace of the character described having in the bottom thereof a well or catch basin, the floor of the furnace sloping downwardly in the direction of said well or catch basin.

2. A furnace of the character described, having in the bottom thereof a well or catch basin, having a small cross-sectional area compared with the area of the furnace and having a capacity equal to only a few per cent. of the capacity of the furnace, the floor of the furnace sloping downwardly toward said well or catch basin.

3. A furnace of the character described having in the bottom thereof a well or catch basin of a capacity slightly greater than necessary to contain the "green" material which remains after the usual fusing of a batch of glass for which the furnace is designed, the floor of the furnace sloping downwardly in the direction of said well or catch basin.

4. A furnace of the character described having in the bottom thereof a well or catch basin of a capacity slightly greater than necessary to contain the "green" material which remains after the usual fusing of a batch of glass for which the furnace is designed, the floor of the furnace sloping downwardly in the direction of said well or catch basin, the mouth of the well or catch basin having an area which is only a small fraction of the cross sectional area of the furnace.

In testimony whereof, I sign this specification in the presence of two witnesses.

DANIEL S. BEEBE.

Witnesses:
T. H. McKINLEY,
CHAS. A. MYERS.